May 5, 1925.
J. F. BYRER
FACING TOOL
Filed June 3, 1922
1,536,878
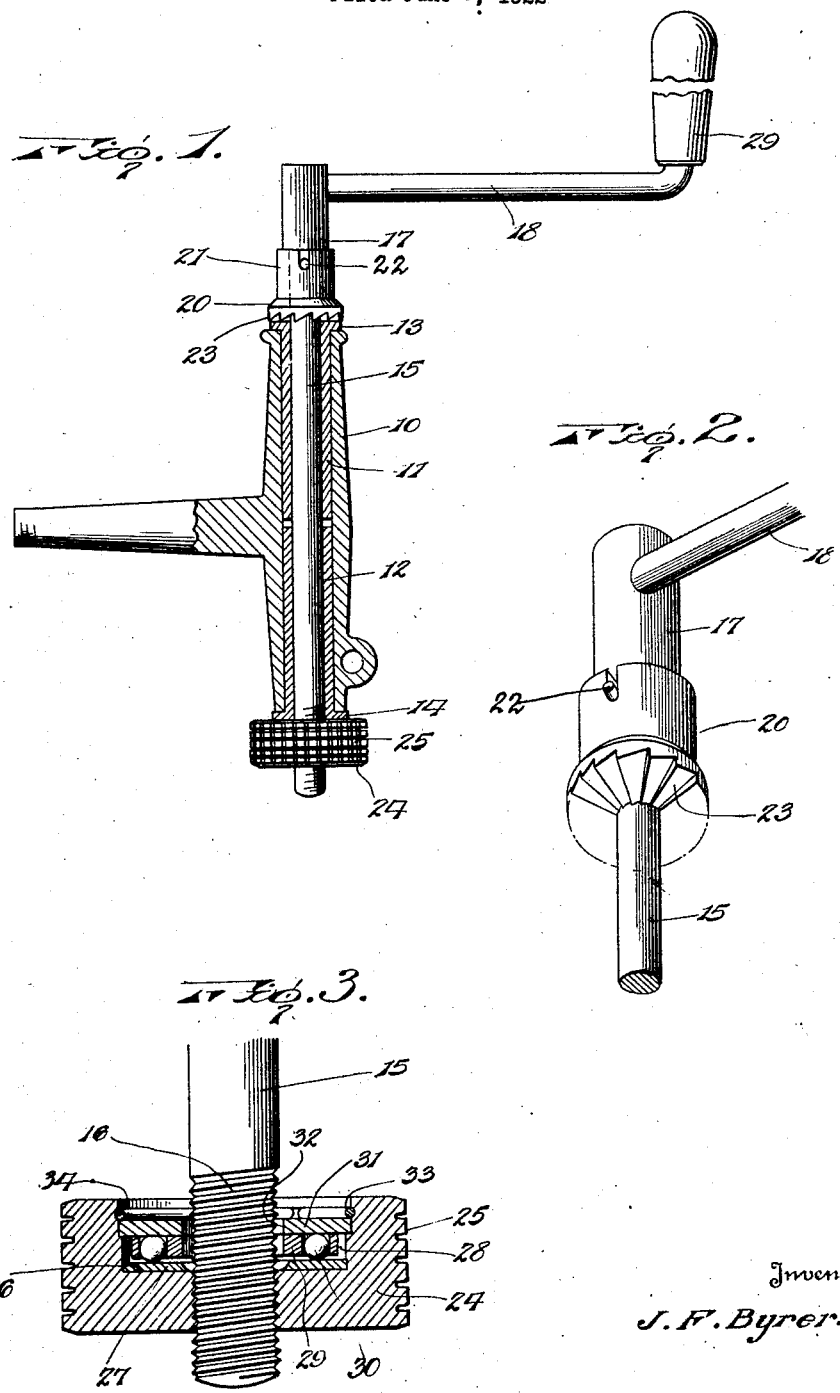

Patented May 5, 1925.

1,536,878

UNITED STATES PATENT OFFICE.

JOEL FREDERICK BYRER, OF KEWANNA, INDIANA.

FACING TOOL.

Application filed June 3, 1922. Serial No. 565,716.

*To all whom it may concern:*

Be it known that I, JOEL F. BYRER, citizen of the United States, residing at Kewanna, in the county of Fulton and State of Indiana, have invented certain new and useful Improvements in Facing Tools, of which the following is a specification.

My invention relates to a tool for facing the ends or flanges of bushings in order to obtain accurate parallel bearing surfaces thereon and to correct the distance between them. The tool is especially useful in fitting bushings in the spindle bodies of the front wheels of Ford and other automobiles. Replacement bushings are furnished with extra heavy flanges to allow for wear in the bearings and the dressing off to proper size of these flanges is generally done by filing, which is a slow procedure and apt to result in very inaccurate work.

The object of this invention is, therefore, to provide a tool which will perform the facing and fitting of such bushings quickly as well as in a most accurate manner.

In the accompanying drawing, one embodiment of the invention is illustrated, and:

Figure 1 shows the tool in position in a spindle body, partly in section,

Figure 2 is a perspective view of a portion of the tool, and

Figure 3 is an axial sectional view of the adjusting device of the tool.

The reference numeral 10 represents a spindle body of a front axle of a Ford automobile with bushings 11 and 12 inserted therein. These bushings each have an outer flange 13 and 14 respectively, which have to be faced and fitted between the axle bearings of the automobile.

The tool consists of a pilot stem 15, which is longer than the overall length of the bushings and is threaded at its outer end 16 and provided with a shoulder 17 at its opposite end. The pilot stem 15 fits in the bore of the bushings 11 and 12 so as to be easily revoluble therein. The shoulder 17 carries a crank 18 with a crank handle 19 for operating the tool. This shoulder may be omitted and the stem 15 and crank 18 made out of a bar of uniform diameter.

A circular cutter 20 fits tightly with its hub 21 around the pilot stem 15, abutting against the shoulder 17, and held in position by a pin 22. In case the stem 15 is straight the pin 22 will act both as a thrust and torsion member. The cutter 20 has milling teeth 23 on its end face, which teeth are of the general character of spot-face cutters.

At the free end of the stem 15 an adjusting nut 24 engages with the threads 16 and the periphery of the nut is preferably knurled, as at 25. The nut is provided with a recess 26 in which is placed a ball thrust bearing 28 of usual construction including a hard steel disc 27 forming the ball race. A perforated plate 29 slightly thinner than the diameter of the balls 30 forms a cage for the latter. A second disc 31 fitting loosely in the recess 26 and having a central bore 32 of larger diameter than the stem 15, lies on top of the balls and is intended to engage with one of the flanges 13 or 14, when the tool is assembled in the bushings. A retainer 33, consisting of a spring steel wire, engages in a groove 34 in the adjusting nut 24 and is adapted to hold the disc 31 in position and with it the rest of the anti-friction bearing.

The operation of the tool is as follows:

The spindle body 10 is clamped in a vise, with the bushings 11 and 12 inserted therein, and preferably with the axes of the bushings in approximately horizontal position. The pilot stem 15 carrying the cutter 20, is thereupon inserted from one end of the spindle body through the bore of the bushings, when the threaded portion 16 will extend through the other end thereof. The adjusting nut 24, together with the anti-friction bearing, is now mounted on the pilot stem 15 and run up against the flange 14, as seen in Fig. 1, its disc 31 contacting with the flange 14 while the cutter 20 engages with the other bushing flange 13, which is now to be faced. The crank 18 is then turned, when the cutter will start facing the end of the flange 13, care being taken that the nut 24 fits loosely over the flange 14 so that it may turn with the stem 15, while the disc 31 is held stationary by the flange 14. The operator of the tool, while turning the crank 18 with one hand, should take hold of the nut with the other hand and adjust the nut 24 in accordance with the depth of the cut made by the cutter 20.

When the flange 13, for instance, has been properly faced, the tool may be reversed and the facing of the flange 14 may be performed in a similar manner, while the distance between the outer faces of the flanges should be calipered from time to time in order to make it agree with the distance between the bearings on the front axle.

Having thus described the invention, what is claimed as new is:

The combination, in a facing tool, of a pilot stem, a milling cutter thereon, an adjusting device comprising a nut threaded on the free end of the stem, a recess of greater diameter than that of the work to be faced being formed in the nut, an anti-friction thrust bearing fitted in the recess, a retaining washer for the thrust bearing fitting loosely around the stem and in the recess, and an annular spring wire fitting in a corresponding groove in the recess adapted to hold the retaining washer in position.

In testimony whereof I affix my signature.

JOEL FREDERICK BYRER. [L. S.]